United States Patent [19]

Tezuka et al.

[11] Patent Number: 5,684,605
[45] Date of Patent: Nov. 4, 1997

US005684605A

[54] FACSIMILE APPARATUS HAVING A FILE TRANSFER FUNCTION

[75] Inventors: Yoshiaki Tezuka; Yoshihiro Maei; Takashi Sakayama, all of Saitama, Japan

[73] Assignee: Fuji Xerox Co., Ltd., Tokyo, Japan

[21] Appl. No.: 393,480

[22] Filed: Feb. 24, 1995

[30] Foreign Application Priority Data

Feb. 28, 1994 [JP] Japan .................................. 6-052631

[51] Int. Cl.⁶ .............................. H04N 1/00; H04N 1/32
[52] U.S. Cl. ........................... 358/435; 358/442; 358/468
[58] Field of Search ..................................... 358/403, 400, 358/434, 435, 436, 438, 439, 442, 468; 379/100

[56] References Cited

U.S. PATENT DOCUMENTS

| 5,418,628 | 5/1995 | Perkins | 358/468 |
| 5,452,106 | 9/1995 | Perkins | 358/468 |
| 5,493,408 | 2/1996 | Kurogane et al. | 358/442 |
| 5,517,324 | 5/1996 | Fite, Jr. et al. | 358/434 |
| 5,528,383 | 6/1996 | Tezuka et al. | 358/435 |

FOREIGN PATENT DOCUMENTS 2-134974 5/1990 Japan.
3-49463 3/1991 Japan.

OTHER PUBLICATIONS

English Abstract for JP 2-134974.

English Abstract for JP 3-49463.

*Primary Examiner*—Edward L. Coles, Sr.
*Assistant Examiner*—Kimberly A. Williams
*Attorney, Agent, or Firm*—Finnegan, Henderson, Farabow, Garrett & Dunner, L.L.P.

[57] ABSTRACT

The present invention provides a facsimile apparatus having a file transfer function which transmits and/or receiving file data utilizing one of a plurality of standardized file transfer modes. An interface connects a facsimile device to an external machine which processes file data transferred from the facsimile device. A determination is made as to whether the external machine connected to the interface is operable. File data is transmitted to the external machine for processing provided the external machine is determined to be operable.

24 Claims, 10 Drawing Sheets

FACSIMILE APPARATUS HAVING A FILE TRANSFER FUNCTION

BACKGROUND OF THE INVENTION

1. Field of the Invention

The present invention relates to a facsimile apparatus having a file transfer function and in particular relates to a facsimile apparatus having a file transfer function which transmits and/or receives file data utilizing any of a plurality of standardized file transfer modes.

2. Discussion of the Related Art

Japanese Patent Application Unexamined Publication Nos. Hei. 2-134974 and Hei. 3-49463, for example, disclose a transfer of file data instead of image information utilizing the procedure of a facsimile apparatus for transferring image information.

However, since the conventional art described above employs a non-standard communication protocol mode, there has been a problem that file transfers cannot be made between machines supplied by different manufacturers. A plurality of file transfer modes have been standardized by additions to ITU-T Recommendation T.30 of February, 1992, whereby file transfer between the machines of different manufacturers is made possible by utilizing the standardized transfer modes.

Each of the standardized transfer modes is defined as follows:

1) Basic Transfer Mode (hereinafter, BTM) provides means to exchange files of plural kinds (binary files, word-processor native format documents, bitmaps, etc.) without file descriptions.

2) Document Transfer Mode (hereinafter, DTM) provides means to exchange files of plural kinds containing file descriptions read by the user.

3) Binary File Transfer (hereinafter, BFT) provides means to exchange files of plural kinds containing file descriptions automatically processed at the receiving side.

A file description is structured information regarding the file, which is transmitted ahead of the file itself and concatenated with it.

As described above, the file description is unnecessary for file transfer performed in the BTM, but is necessary for file transfer performed in the DTM or BFT mode. Moreover, the file description structure of the DTM is greatly different from that of the BFT mode. Therefore, if it is desired to use a transmitting facsimile to transfer a file in the DTM, file transfer cannot be achieved if the receiving side facsimile apparatus does not have the DTM.

The receiving side facsimile apparatus can process a received file by itself, and moreover, an external machine such as a host computer or an external printer connected to the receiving facsimile apparatus through an interface can also process the file.

The external machine, such as the host computer generally has capabilities higher than those of the receiving facsimile apparatus itself regarding file data processing (size of display means or printing means, preciseness, display speed, printing speed or the like), to print and output the file descriptions. Thus, there are many cases where outputting from the printing means of the external machine is superior in efficiency or representation quality to that of the printing means of the receiving facsimile apparatus itself. Even if the receiving facsimile apparatus has little capability regarding file transfer, file transfer in the DTM or BFT mode is possible provided the external machine is connected to the receiving facsimile apparatus.

However, if no particular instruction is given, the facsimile apparatus will process the file by itself even though the external machine is connected to the facsimile apparatus. As such, the external machine cannot be used efficiently. Moreover, since no communicating means has been available between the transmitting and receiving facsimile apparatuses to indicate that the external machine is available on the receiving side, the receiving apparatus has selected a transfer mode only according to its own capability.

SUMMARY OF THE INVENTION

The present invention has been made in view of the above circumstances and has as an object the provision of a facsimile apparatus having a file transfer function which resolves the problems described above.

A further object of the present invention is to provide a facsimile apparatus having a file transfer function which effectively utilizes external machines and fully exercises the capability of each file transfer mode, thus making it possible to perform efficient file transfers.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, a facsimile apparatus having a file transfer function of this invention, which transmits and/or receives file data utilizing one of a plurality of standardized file transfer modes, comprises interface means for connecting an external machine which processes transferred file data, determining means for determining whether the external machine connected to the interface means is operable, and transmission means for transmitting the transferred file data to the external machine provided that the external machine connected to the interface means is determined to be operable by the determining means.

BRIEF DESCRIPTION OF THE DRAWINGS

The accompanying drawings, which are incorporated in and constitute a part of this specification illustrate embodiments of the invention and, together with the description, serve to explain the objects, advantages and principles of the invention. In the drawings.

DETAILED DESCRIPTION OF THE PREFERRED EMBODIMENTS

First Embodiment

Figure 12:
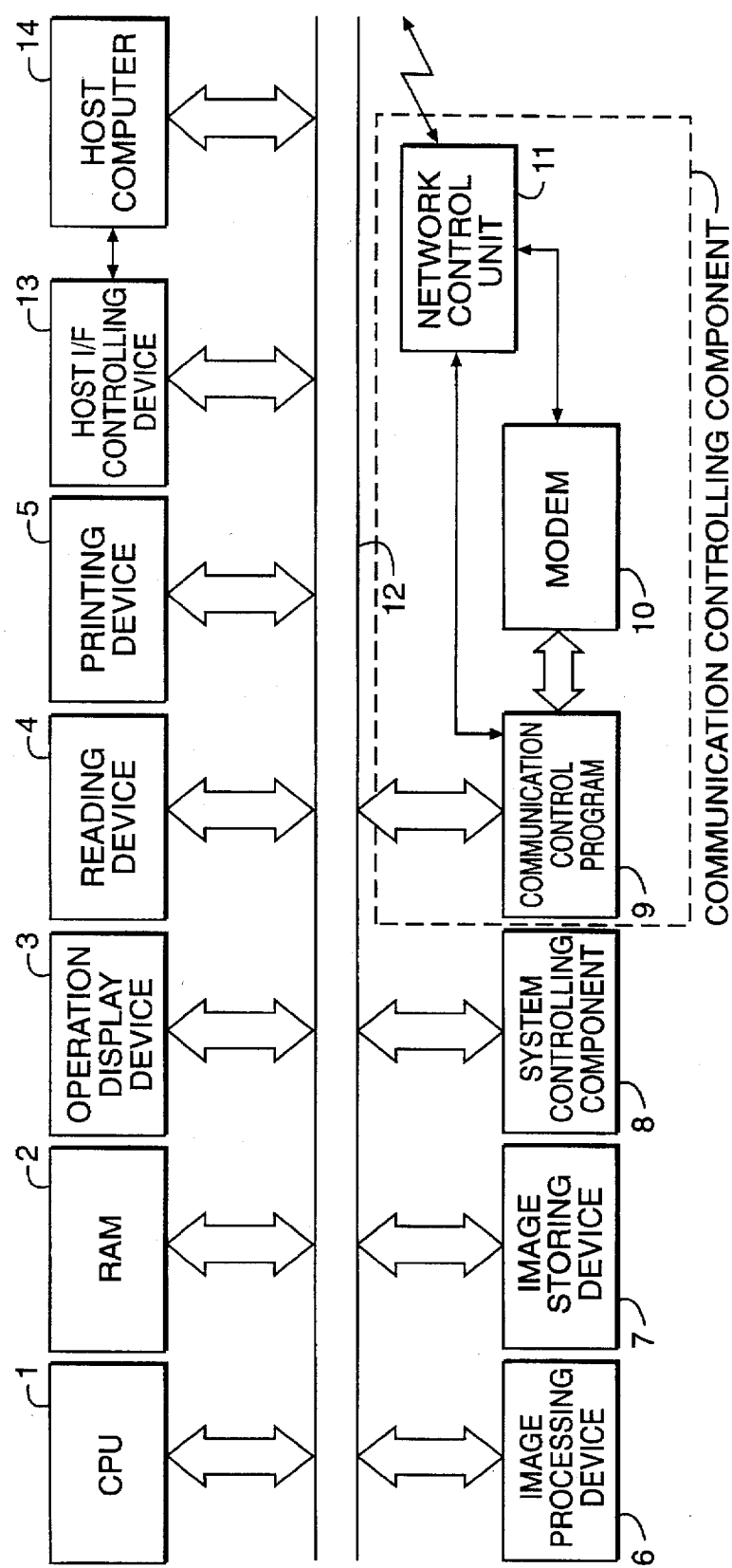
FIG. 12 is a block diagram of a facsimile apparatus having a file transfer function according to the present invention.

Preferred embodiments of a facsimile apparatus having a file transfer function according to the present invention are now described in detail based on the drawings. FIG. 12 is a block diagram showing the construction of a main part of a facsimile apparatus to which the present invention is applied.

A CPU 1 carries out the controlling process for the whole facsimile apparatus and a process for facsimile transmission control according to a program stored in a system controlling component 8. A RAM 2 is a memory used as a work area for the control program. An operation display device 3 has an operation component comprises a ten-key keyboard and a display component of a liquid crystal panel (or a CRT image plane) for providing instructions for operation of the facsimile apparatus or for displaying the instructions or a state of operation.

A reading device 4 reads a document to be transferred using a CCD image sensor, for example, and converts it to image information in an electrical signal. The image information read by the reading device 4 or received image information is stored in an image storing device 7.

A printing device 5 prints received image data or the like. An image processing device 6 performs coding and decoding (compression and extension) between the image signal and a transfer code.

The system controlling component 8 comprises a ROM which stores a control program for the whole facsimile apparatus. A communication controlling component (dotted box) comprises a communication control program 9 for G3 facsimile apparatus, a modem 10 and a network control unit 11. The modem 10 is a modulation/demodulation device having a low-speed modem (V.21) for a transmission procedure signal and a high-speed modem (V.27 ter, V.29, V.33, V.17 and so forth) for transmitting and/or receiving image information. The network control unit 11 is a circuit interfacing with the switched telephone network and provides an automatic calling/called function.

A host computer 14, which may be a workstation, personal computer or the like, is connected to the facsimile apparatus through a host I/F controlling device 13. Each of the circuits 1–9 and 13 in the facsimile apparatus transmits and/or receives data through a system bus 12.

The following is a detailed flow chart based on the description of operation of each embodiment according to the present invention.

Figure 1:
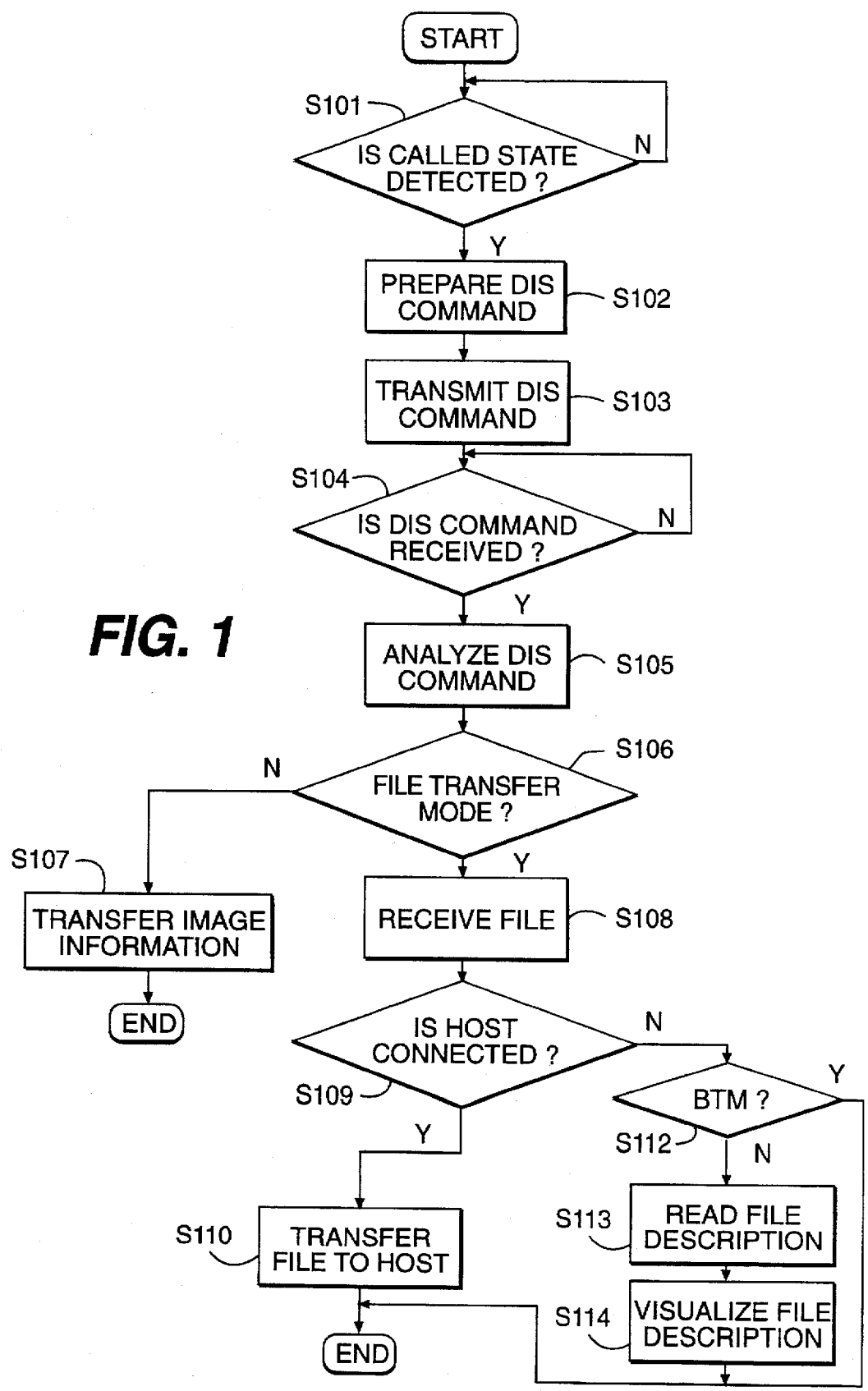
FIG. 1 is a flow chart showing an operation of a first embodiment of facsimile apparatus according to the present invention.
Figure 2:
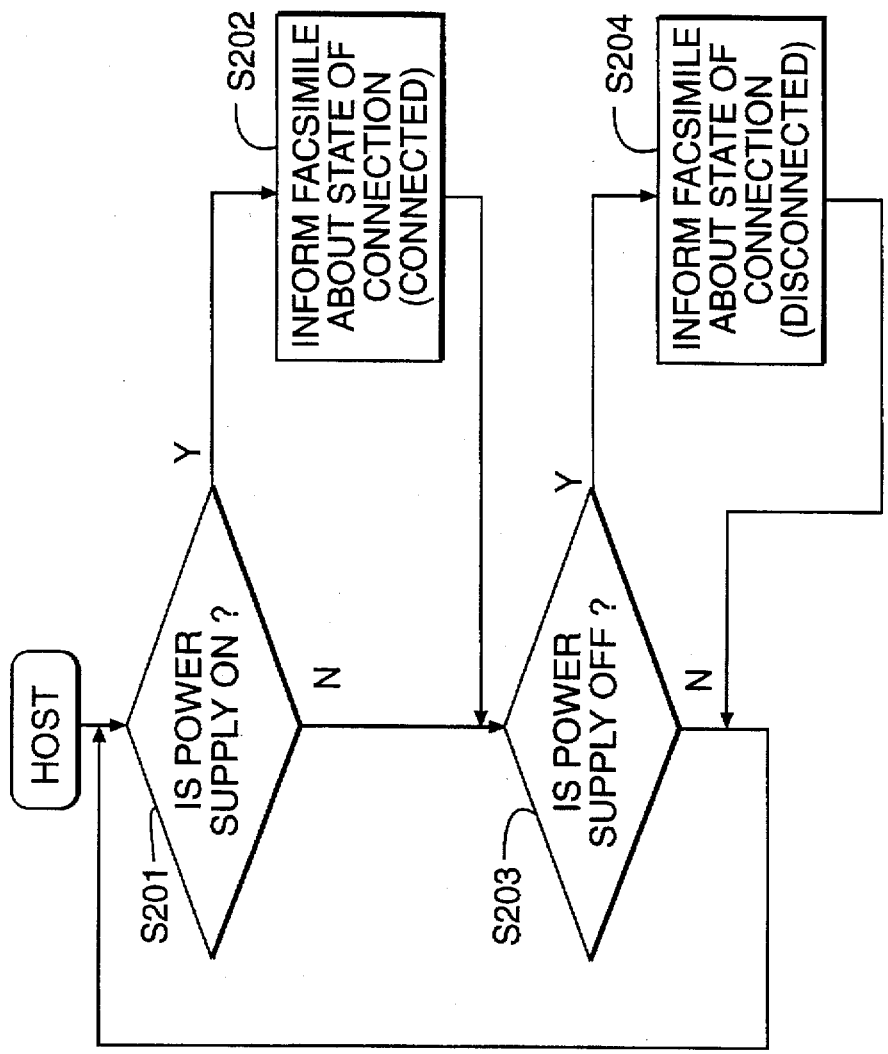
FIG. 2 is a flow chart showing a task which is periodically carried out by a host computer.
Figure 3:
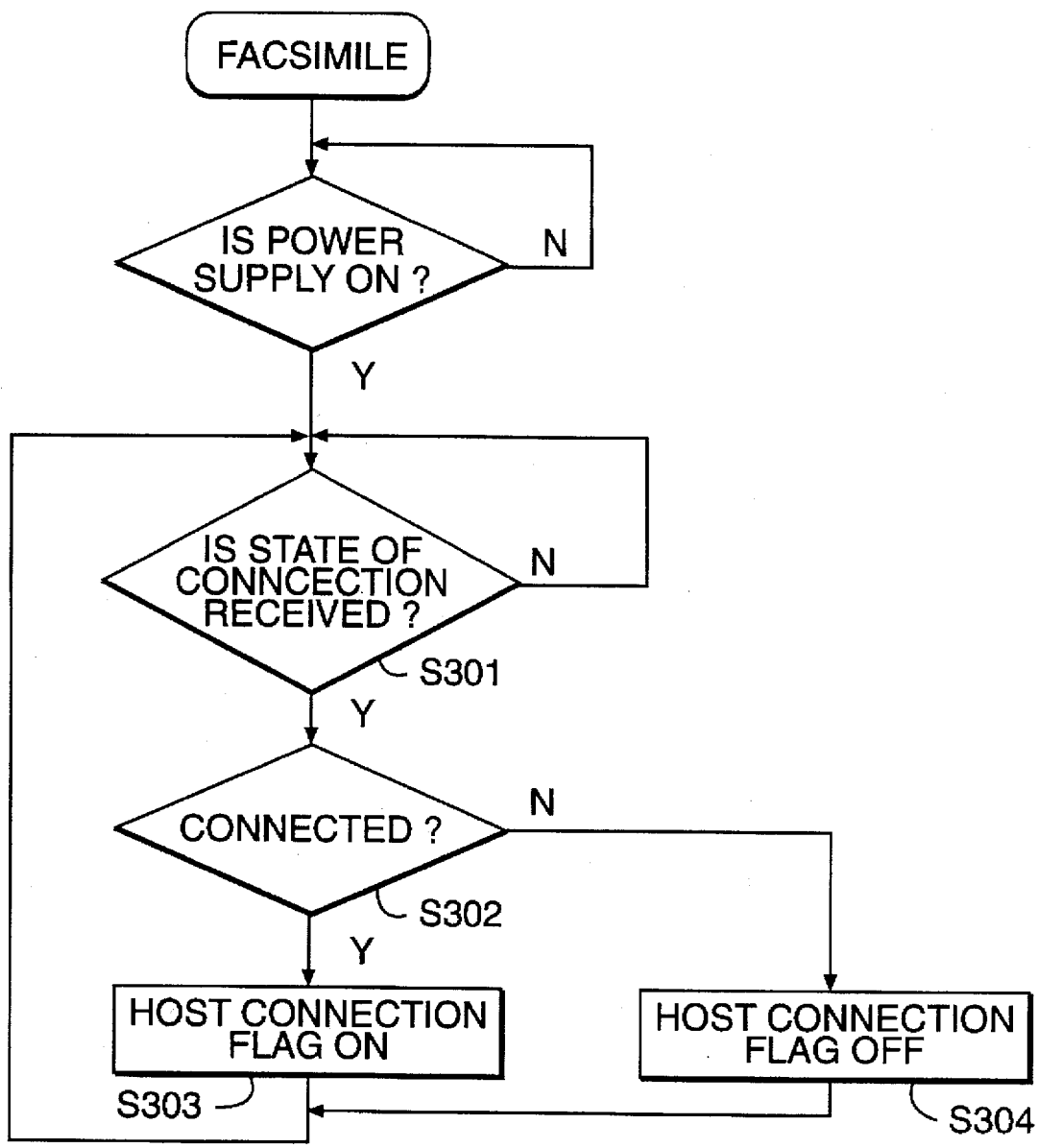
FIG. 3 is a flow chart showing a task which is periodically carried out by the facsimile apparatus.

FIG. 1 is a flow chart showing the operation of a first embodiment of the facsimile apparatus according to the present invention, which is, for example, a process carried out by the CPU 1 in accordance with the program stored in the system controlling component 8. FIG. 2 is a flow chart showing the operation of a task periodically performed by the host computer 14. FIG. 3 is a flow chart showing the operation of a task periodically performed by the facsimile apparatus.

In FIG. 2, a state of a main power supply is determined in steps 201 and 203 in the host computer 14. If the main power supply is on and file data processing is practicable, the host computer 14 informs the facsimile apparatus that it is connected to the facsimile apparatus in step 202. If the main power supply is off and file data processing is not practicable, the host computer 14 informs the facsimile apparatus that it is not connected to the facsimile apparatus in step 204.

In FIG. 3, when the power supply of the facsimile apparatus is turned on, it is determined in step 301 whether information about the state of connection described above is provided by the host computer 14. If information is provided, the state of connection is determined, in step 302 from such information. If "connected" is determined in step 202 of FIG. 2, a host connection flag is set to be on in step 303. If "not connected" is determined in step 204 described above, the host connection flag is set to be off in step 304.

Figure 10:
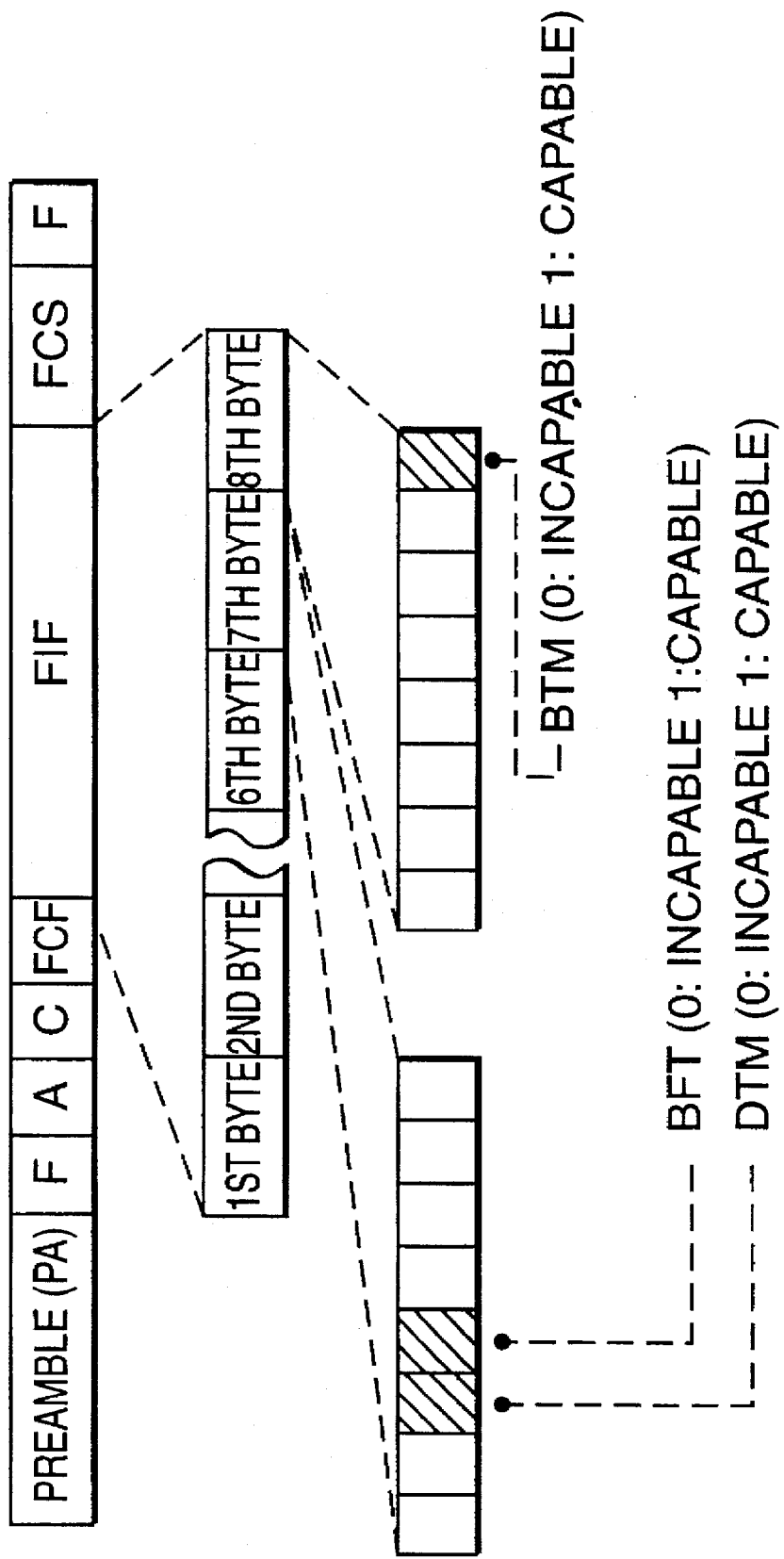
FIG. 10 is an example of a frame construction of a DIS command.

If a called state is detected in step 101 of FIG. 1 under the condition that the above-described task is carried out, the communication protocol starts. A DIS command is prepared in step 102 and is transmitted to a calling station in step 103. In step 104, it is determined whether a DCS command transmitted from the calling station in response to the DIS command is received. If the DCS command is received, the DCS command is analyzed in step 105. FIG. 10 shows an example structure of the DIS command which comprises a preamble (PA), a flag pattern (F), an address field (A), a control field (C), a facsimile control field (FCF), a facsimile information field (FIF) and a frame check sequence (FCS) or the like. The FCF differs corresponding to the type of the command: in the case of the DIS command, information indicating that the frame is a DIS command is stored in the FCF, and in the case of the DCS command, information indicating that the frame is a DCS command is stored in the FCF.

In the DIS command and the DCS command, capability regarding the file transfer is defined at 7th and 8th bytes of FIF as shown in FIG. 10. That is, whether there is capability for file transfer in the BFT mode is defined in Bit 53 of FIF in accordance with the bit state, and, in the same way, capability for file transfer in the DTM is defined in Bit 54 and capability for file transfer in the BTM is defined in Bit 57 of FIF.

Consequently, if the called station facsimile apparatus has BFT, DTM and BTM, the DCS command, in which each of Bit 53, 54 and 57 of FIF is set to "1", is transmitted to the calling station. If the calling station, having received the DIS command, selects the DTM, for example, the DCS command setting Bit 54 of FIF to "1" is returned.

Reference is again made to FIG. 1. As a result of analysis of the DCS command in step 105 described above, if all of Bits 53, 54 and 57 of FIF are "0" the transfer mode is determined to be a normal image information transfer mode in step 106, and, in step 107, image information is then received and stored in the image storing device 7. If any one of Bits 53, 54 and 57 is set to "1", the transfer mode is determined to be the file transfer mode, and, as indicated by step 108, file data is received with the file description and stored in the image storing device 7.

In step 109, it is determined whether the host computer 14 is connected to the host I/F controlling device 13 on the basis of the host connection flag. If it is connected, in step 110, the stored file data is transferred to the host computer 14. If the host computer 14 is determined not to be connected, the transfer mode is determined on the basis of the result of the analysis in step 105, and, if the transfer mode specified by the calling station is the BTM, process is finished without preparing the file description.

Figure 4:
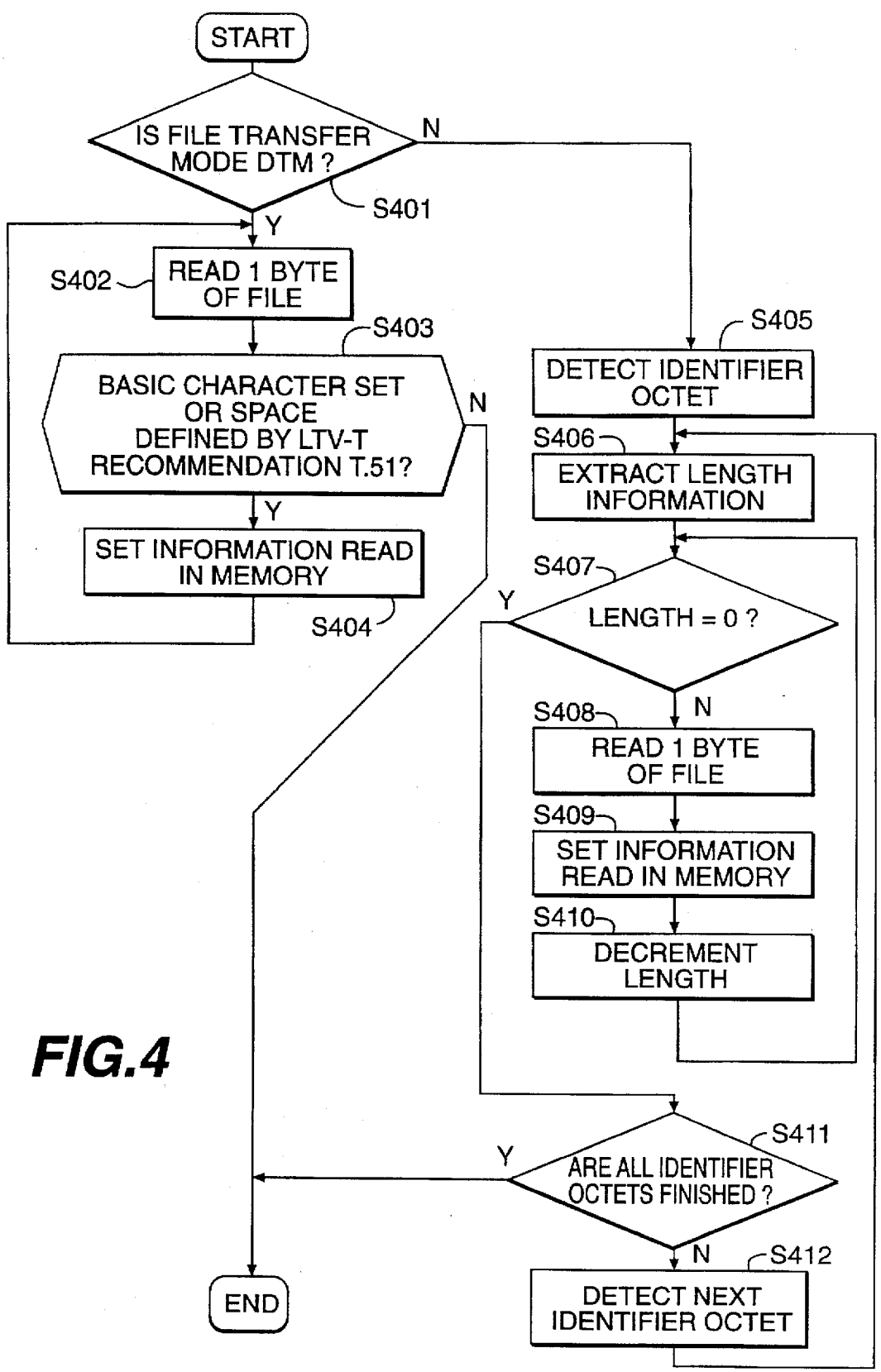
FIG. 4 is a flow chart showing a method of cutting out a file description in the facsimile apparatus according to the present invention.

If the specified transfer mode is the DTM or BFT mode, and not the BTM, the file description is cut out from the file data in step 113. FIG. 4 is a flow chart showing the procedure for cutting out the file description.

After the step for cutting out the file description is started, step 401 determines whether the file transfer is carried out in the DTM. If the file transfer is determined to be performed in the DTM, only 1 byte of the file data stored in the image storing device 7 is read out in step 402. In step 403, it is determined whether the data read out is a basic character set or a space defined by the ITU-T Recommendation T. 51. If it is the character set or space, the data of 1 byte having been read out is set, in step 404, in an expected area in the image storing device, for example, as visualizing information.

Thereafter, this process is continued until data other than the character set or space is read out. When reading of the file description part is completed and data other than the character set or space is read out, the file description is cut out and the process proceeds to step 114.

If the transfer mode is determined to be the BFT mode, and not the DTM, an identifier octet which indicates existence of data area (data sequence) including visualizing information is detected from the file in step 405. In step 406, length information is taken out of the data area. The length information indicates the number of bytes of visualizing information included in the data area. In steps 407 through 410, file data corresponding to the number of bytes provided as the length information is read out from the data area managed by the identifier octet, and set in the image storing device 7 as the visualizing information.

If the length is determined to "0" in step 407, a determination is made as to whether the detection of all identifier octets is completed in step 411. If there is another octet, it is detected in step 412 and the above-described process is repeated.

Figure 5:
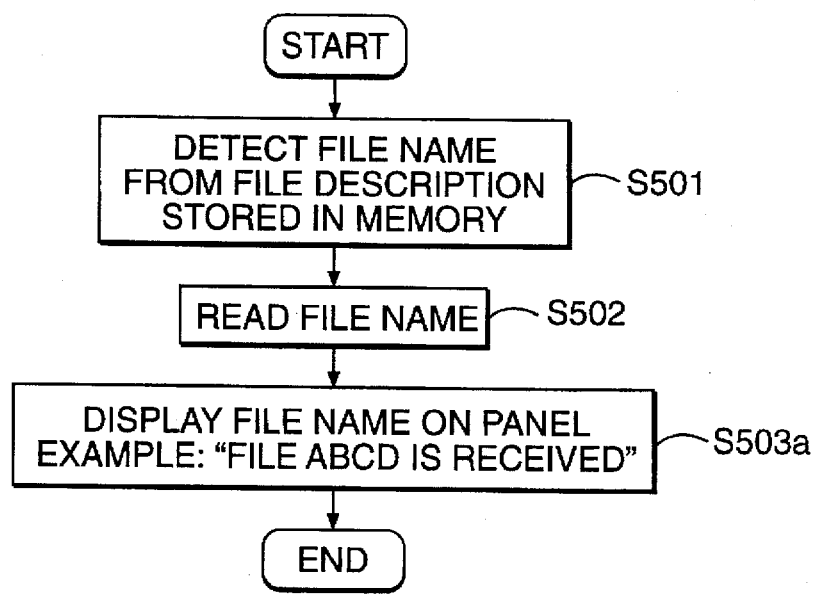
FIG. 5 is a flow chart showing a procedure of visualizing the file description on a display panel.
Figure 6:
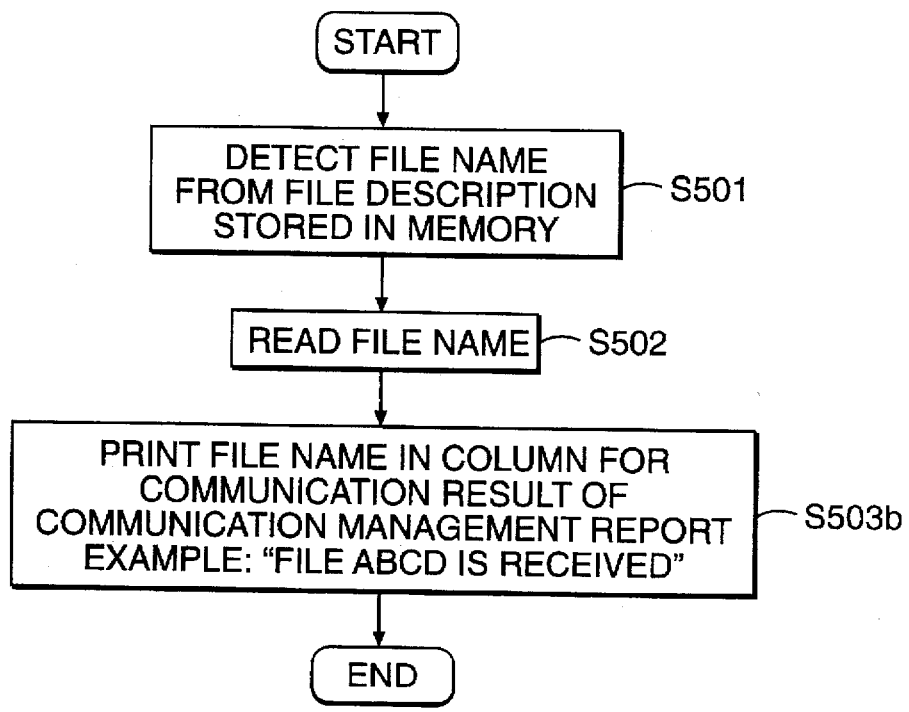
FIG. 6 is a flow chart showing a procedure of visualizing the file description on a communication management report.
Figure 7:
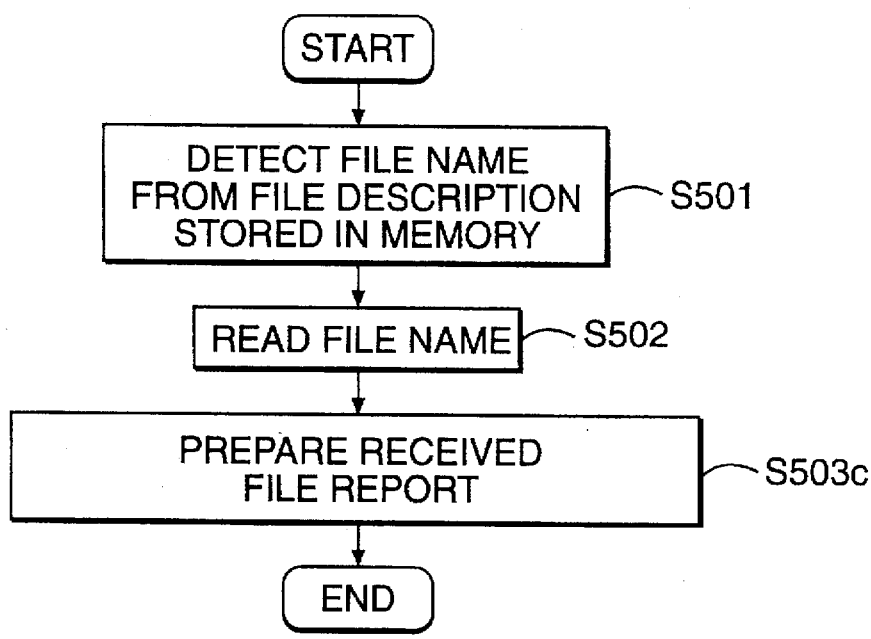
FIG. 7 is a flow chart showing a procedure of visualizing the file description on a received file report.

If cutting out of the file description is completed by the process described, the file description is visualized in step 114 of FIG. 1. FIGS. 5, 6 and 7 are flow charts showing procedures for visualizing the file descriptions on a display panel, a communication management report and a received file report, respectively.

In any case, a file name, for example, "ABCD", stored as the visualizing information is detected in the image storing device 7 in step 501 and the file name is read out from the image storing device 7 in step 502. After that, in the case of visualizing on the display panel, a display is shown on the display panel of the operation control device 3 to the effect that the file "ABCD" is received (see step 503(a) of FIG. 5).

In the case of visualizing the file name on the communication management report, the name is printed in the column for the communication result of the communication management report (shown in step 503(b) of FIG. 6).

Figure 8:
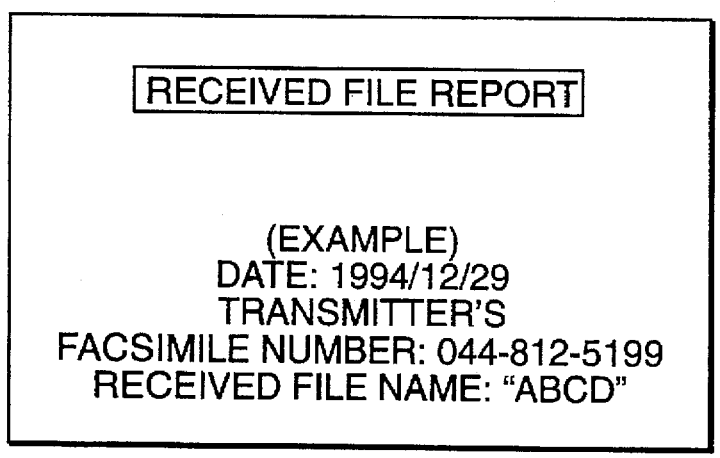
FIG. 8 is an example of a received file report on which the file description is visualized.

If it is required to visualize the file name on the received file report, the received file report is accordingly prepared (shown in step 503(c) of FIG. 7). FIG. 8 is an example of the received file report prepared in step 503(c) in which a file name "ABCD" is recorded with the receiving date and a transmitter's facsimile number.

According to the above description, if the external machine having a file transfer function is connected to the facsimile apparatus, transferred file data is preferentially and automatically transmitted to the external machine to be processed; therefore file processing of high efficiency and high quality is available by using the first embodiment.

Second Embodiment

Figure 9:
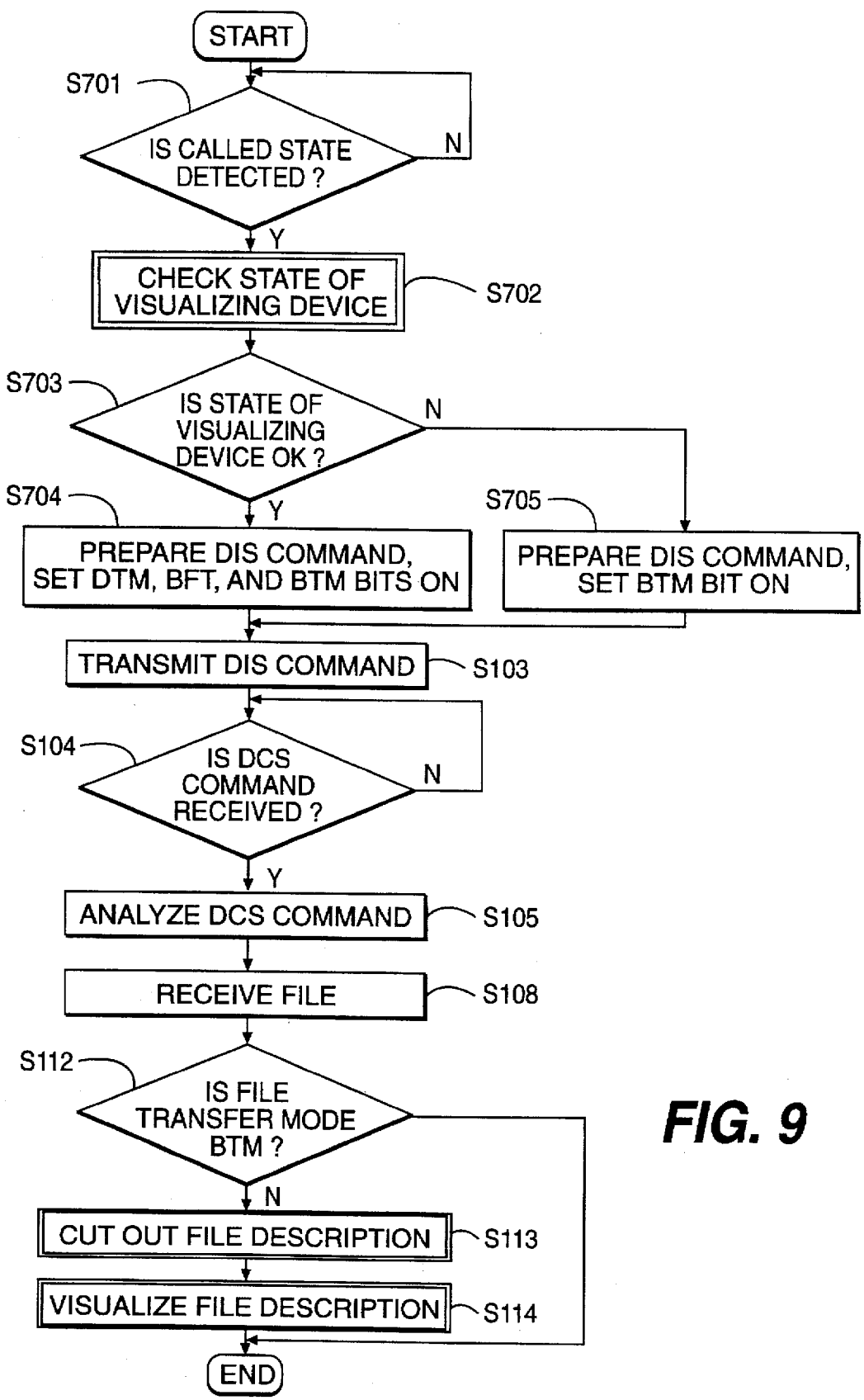
FIG. 9 is a flow chart showing an operation of a second embodiment of the facsimile apparatus according to the present invention.

FIG. 9 is a flow chart showing the operation of a second embodiment of facsimile apparatus according to the present invention. Constituents corresponding to or equivalent to constituents of the first embodiment have the same reference numbers as those of the first embodiment.

In this embodiment, after a called state is detected in step 701, a state of a file description visualizing device is checked in step 702 as follows.

Figure 11:
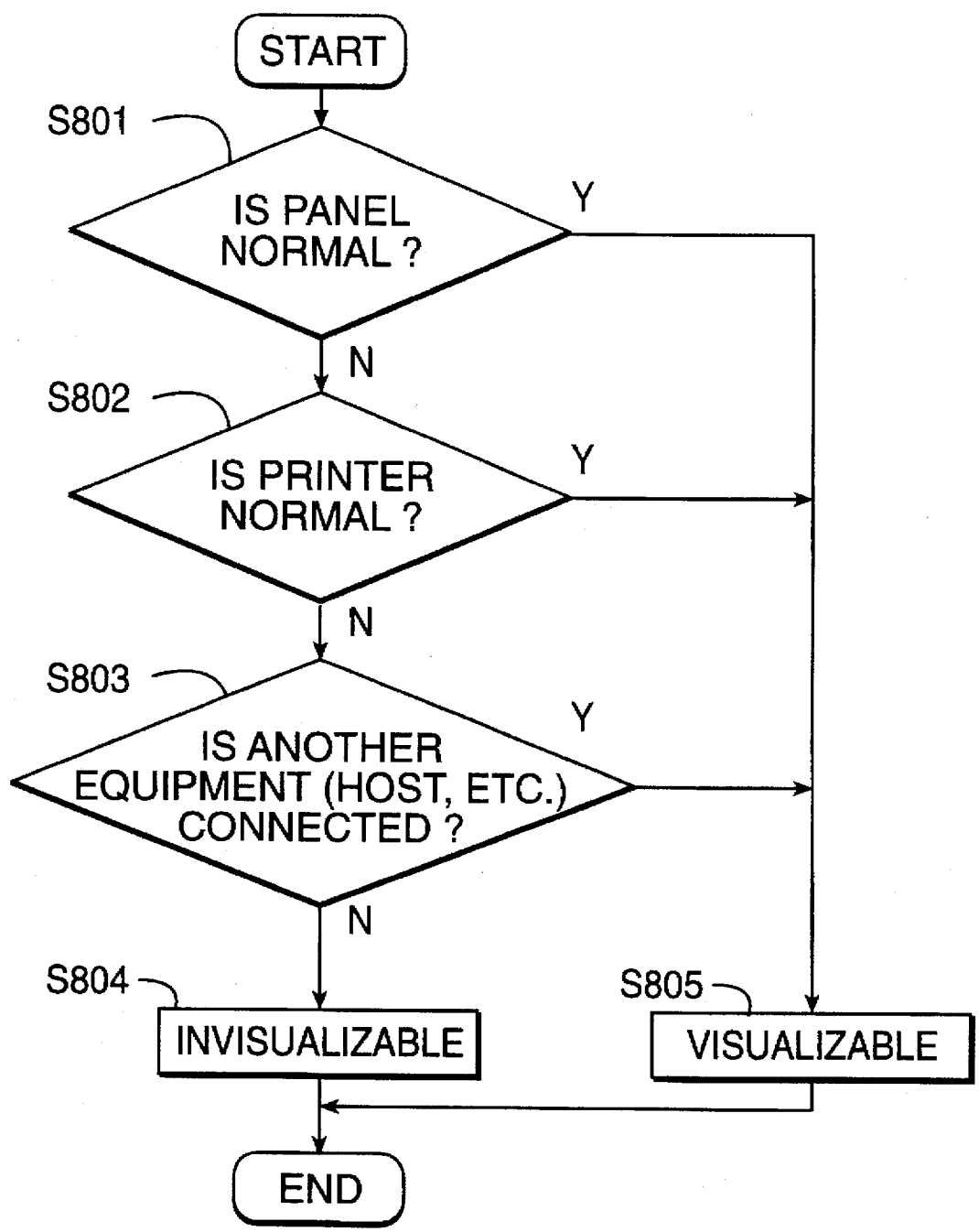
FIG. 11 is a flow chart showing a procedure of checking the state of a visualizing device.

FIG. 11 is a flow chart showing the procedure for checking the operation of the file description visualizing device. In step 801, a state of a display panel on the operation display device 3 is checked, and, if the display panel is out of order, a state of the printing device 4 is checked in step 802. If the printing device 4 is also out of order, it is checked in step 803 whether an external machine, such as a host computer, external printer, or the like, is connected through the host I/F controlling device 13.

If it is determined that the external machine is not connected to the facsimile apparatus, its operation is determined to be unavailable or "unvisualizable" in step 804. If an affirmative determination is provided at least in one of steps 801, 802 and 803, that is, if it is determined that at least one visualizing device is available, it is determined to be "visualizable" in step 805.

Reference is again made to FIG. 9. After visualizing device checking is completed as described, the checking result in step 702 is based in step 703. If the result is "visualizable" the DIS command, which sets all Bits 53 (capability for file transfer in the BFT mode), 54 (capability for file transfer in the DTM) and 57 (capability for file transfer in the BTM) of FIF to "1" is prepared in step 704 as previously explained (FIG. 10). If the checking result is "unvisualizable" the DIS command setting only Bit 57 (capability for file transfer in the BTM) to "1" is prepared.

After the DIS command is prepared, the prepared DIS command is transmitted to the calling station in step 103 as in the first embodiment. The DCS command from the calling station is received in step 104. The DCS command is then analyzed to decide the file transfer mode in step 105. Next, the file data is received in step 108.

When the file data is completely received, the file transfer mode is determined in step 112. If it is the DTM or the BFT mode, cutting out of the file description is carried out in step 113. In step 114, the file description is visualized by the visualizing device determined to be available in step 702.

According to the present embodiment, determination of capability can be provided regarding the file transfer mode corresponding to the states of visualizing devices or state of connection of the external machine. Therefore, no inconvenience occurs, i.e., such that a file including the file description which should be visualized is inadequately transferred when the visualizing device or external machine is not available.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A facsimile apparatus comprising:
   a facsimile device having a file transfer function which transmits and/or receives file data utilizing one of a plurality of standardized file transfer modes;
   interface means for connecting the facsimile device to an external machine which processes file data transferred thereto;
   determining means for determining whether said external machine connected to said interface means is operable;
   transmission means for transmitting file data from said facsimile device to said external machine for processing provided that said external machine connected to said interface means is determined to be operable by said determining means; and
   capability announcing means for announcing that file receiving is possible only in the file transfer mode in which transmitting of a file description is not necessary before a file is transmitted in the case where said external machine is not operable, and that file receiving is possible in both the file transfer mode in which transmitting of said file description is necessary and the file transfer mode in which file transmitting of said file description is not necessary in the case where said external machine is operable.

2. The facsimile apparatus having a file transfer function according to claim 1, wherein
   said file transfer mode in which transmitting of a file description is necessary before a file is transmitted is a Binary File Transfer (BFT) mode or a Document Transfer Mode (DTM), and said file transfer mode in which transmitting of said file description is not necessary is a Basic Transfer Mode (BTM).

3. The facsimile apparatus according to claim 2, wherein
   said file description is cut out from transferred file data and visualized in the case where said file transfer mode is the DTM.

4. The facsimile apparatus according to claim 2, wherein
   only visualizing information is cut out from said file description in said transferred file data and visualized in the case where said file transfer mode is the Binary File Transfer (BFT) mode.

5. The facsimile apparatus according to claim 1, wherein
   said capability announcing means performs capability announcement by setting a bit of a facsimile information field (FIF) in a DIS frame corresponding to the capability to be "1".

6. The facsimile apparatus according to claim 5, wherein
   said file transfer mode in which transmitting of a file description is necessary before a file is transmitted is a Binary File Transfer (BFT) mode or a Document Transfer Mode (DTM), and said file transfer mode in which transmitting of said file description is not necessary is a Basic Transfer Mode (BTM).

7. The facsimile apparatus according to claim 6, wherein
   said file description is cut out from transferred file data and visualized in the case where said file transfer mode is the DTM.

8. The facsimile apparatus according to claim 6, wherein
   only visualizing information is cut out from said file description in said transferred file data and visualized in the case where said file transfer mode is the Binary File Transfer (BFT) mode.

9. A facsimile apparatus having a file transfer function which transmits file data to a receiving side facsimile apparatus utilizing one of a plurality of standardized file transfer modes comprising:
   visualizing means for visualizing a file description transferred with a file;
   determining means for determining whether said visualizing means is operable; and
   capability announcing means for announcing that file receiving is possible only in the file transfer mode in which transmitting of a file description is not necessary before a file is transmitted in the case where said visualizing means is not operable, and that file receiving is possible in both the file transfer mode in which transmitting of said file description is necessary and the file transfer mode in which transmitting of said file description is not necessary in the case where said visualizing means is operable.

10. The facsimile apparatus according to claim 9, further comprising:
    interface means for connecting the receiving side facsimile apparatus to an external machine which processes transferred file data; and
    determining means for determining whether said external machine connected to said interface means is operable;
    wherein said capability announcing means announces that file receiving is possible only in the file transfer mode in which transmitting of a file description is not necessary before a file is transferred in the case where neither said external machine nor said visualizing means are operable, and that file receiving is possible in both the file transfer mode in which transmitting of said file description is necessary and the file transfer mode in which transmitting of said file description is not necessary in the case where said at least one of said external machine and said visualizing means is operable.

11. The facsimile apparatus according to claim 10, wherein
    said capability announcing means performs capability announcement by setting a bit of a facsimile information field (FIF) in a DIS frame corresponding to the capability to be "1".

12. The facsimile apparatus according to claim 11, wherein
    said file transfer mode in which transmitting of a file description is necessary before a file is transmitted is a Binary File Transfer (BFT) mode or a Document Transfer Mode (DTM), and said file transfer mode in which transmitting of said file description is a Basic Transfer Mode (BTM).

13. The facsimile apparatus according to claim 12, wherein
    said file description is cut out from transferred file data and visualized in the case where said file transfer mode is the DTM.

14. The facsimile apparatus according to claim 12, wherein
    only visualizing information is cut out from said file description in said transferred file data and visualized in the case where said file transfer mode is the Binary File Transfer (BFT) mode.

15. The facsimile apparatus according to claim 10, wherein said file transfer mode in which transmitting of a file description is necessary before a file is transmitted is a Binary File Transfer (BFT) mode or a Document Transfer Mode (DTM), and said file transfer mode in which transmitting of said file description is not necessary is a Basic Transfer Mode (BTM).

16. The facsimile apparatus according to claim 15, wherein said file description is cut out from transferred file data and visualized in the case where said file transfer mode is the DTM.

17. The facsimile apparatus according to claim 15, wherein only visualizing information is cut out from said file description in said transferred file data and visualized in the case where said file transfer mode is the Binary File Transfer (BFT) mode.

18. The facsimile apparatus according to claim 9, wherein said capability announcing means performs capability announcement by setting a bit of a facsimile information field (FIF) in a DIS frame corresponding to the capability to be "1".

19. The facsimile apparatus according to claim 18, wherein said file transfer mode in which transmitting of a file description is necessary before a file is transmitted is a Binary File Transfer (BFT) mode or a Document Transfer Mode (DTM), and said file transfer mode in which transmitting of said file description is not necessary is a Basic Transfer Mode (BTM).

20. The facsimile apparatus according to claim 19, wherein said file description is cut out from transferred file data and visualized in the case where said file transfer mode is the DTM.

21. The facsimile apparatus according to claim 19, wherein only visualizing information is cut out from said file description in said transferred file data and visualized in the case where said file transfer mode is the Binary File Transfer (BFT) mode.

22. The facsimile apparatus according to claim 9, wherein said file transfer mode in which transmitting of a file description is necessary before a file is transmitted is a Binary File Transfer (BFT) mode or a Document Transfer Mode (DTM), and said file transfer mode in which transmitting of said file description is not necessary is a Basic Transfer Mode (BTM).

23. The facsimile apparatus according to claim 22, wherein said file description is cut out from transferred file data and visualized in the case where said file transfer mode is the DTM.

24. The facsimile apparatus according to claim 22, wherein only visualizing information is cut out from said file description in said transferred file data and visualized in the case where said file transfer mode is the Binary File Transfer (BFT) mode.

* * * * *